US008725792B1

(12) United States Patent
Pik

(10) Patent No.: US 8,725,792 B1
(45) Date of Patent: May 13, 2014

(54) RAPID LOADING OF MULTIPLE FRAMES' CONTENT

(75) Inventor: Yossi Pik, Tel Aviv (IL)

(73) Assignee: SAP Portals Israel Ltd., Raanana (IL)

( * ) Notice: Subject to any disclaimer, the term of this patent is extended or adjusted under 35 U.S.C. 154(b) by 528 days.

(21) Appl. No.: 10/306,800

(22) Filed: Nov. 27, 2002

(51) Int. Cl.
*G06F 15/16* (2006.01)
*G06F 9/46* (2006.01)

(52) U.S. Cl.
USPC ........... 709/203; 709/219; 709/227; 709/228; 709/229; 719/311; 719/330

(58) Field of Classification Search
USPC ......... 709/203, 206, 217, 219, 227, 228, 229; 717/115; 719/311, 330; 715/240
See application file for complete search history.

(56) References Cited

U.S. PATENT DOCUMENTS

| | | | |
|---|---|---|---|
| 6,006,260 A * | 12/1999 | Barrick | 709/224 |
| 6,151,599 A * | 11/2000 | Shrader et al. | 707/9 |
| 6,523,022 B1 * | 2/2003 | Hobbs | 1/1 |
| 6,636,863 B1 * | 10/2003 | Friesen | 707/102 |
| 6,701,368 B1 * | 3/2004 | Chennapragada et al. | 709/228 |
| 6,771,288 B2 * | 8/2004 | Boulter | 715/736 |
| 7,000,008 B2 * | 2/2006 | Bautista-Lloyd et al. | 709/219 |
| 7,047,502 B2 * | 5/2006 | Petropoulos et al. | 715/781 |
| 7,055,097 B1 * | 5/2006 | Netsch | 715/207 |
| 7,058,944 B1 * | 6/2006 | Sponheim et al. | 718/100 |
| 7,114,177 B2 * | 9/2006 | Rosenberg et al. | 726/4 |
| 7,500,188 B1 * | 3/2009 | Trapani et al. | 715/273 |

OTHER PUBLICATIONS

Costello et al., Web DevCenter: Remote Scripting with IFRAME, Feb. 8, 2002, http://www.oreillynet.com/lpt/a/1557, p. 1-7.*

* cited by examiner

*Primary Examiner* — Gregory Todd
(74) *Attorney, Agent, or Firm* — Mintz Levin Cohn Ferris Glovsky and Popeo, P.C.

(57) ABSTRACT

Systems and techniques to rapidly load multiple frames' content. According to an aspect, a system includes a server to transmit an initial document including frames corresponding to multiple information sources, to retrieve data from the multiple information sources, and to transmit one or more subsequent documents including the data and one or more scripts. The system further includes a browser to receive and display the initial document including the frames without the data, to receive the one or more subsequent documents, and to run the one or more scripts that cause writing of the data, with external scripts inserted, inside the frames. As a result, the data can be displayed in an order of receipt, irrespective of a layout order of the frames.

15 Claims, 4 Drawing Sheets

RAPID LOADING OF MULTIPLE FRAMES' CONTENT

BACKGROUND

The present application describes systems and techniques relating to client-server communication.

A client-server environment is a network architecture in which clients generally rely on servers for resources, such as files, databases, devices, processing power, etc. The World Wide Web and its associated Web servers and Web browsers are a typical example of a client-server environment using an existing underlying network (e.g., the Internet) for communications. In a client-server environment, a page can be sent to a client, such as in the form of a Hypertext Markup Language (HTML) page, and processed at the client to generate a display (e.g., a window presenting the rendered page). A page delivered to a client can include multiple frames, embedded functionality (e.g., scripts), and/or references to additional network resources, which may be used in constructing a visual display at the client based on the transmitted page. For example, the references may be links to additional pages, which may be dynamically generated by various servers, that are retrieved by the client to populate the frames specified by a first page.

Typically, a client requests a page from a server, the server retrieves or generates the page and sends it to the client, and the client renders the page for display. When the page includes multiple frames, rendering the page at the client generally involves creating a visual layout as designated by the frames and retrieving additional pages over the network as specified by the previously received page. Thus, a single page can be used to orchestrate retrieval and display of multiple pages in a single browser window. The client establishes multiple connections to one or more servers in order to obtain all the information needed for display, although typically, the client can only open a limited number of full connections (e.g., 2-4) to a server at a time. In some network scenarios, such as in satellite communication, the cost of each connection can be large.

Moreover, the frames specified in a first page and the additional pages retrieved according to the frames can present a user interface that enables a user to interact with the displayed information and/or network resources. For example, the additional pages presented in the frames can include and/or refer to applications that display, and allow a user to interact with, information from any data source (e.g., enterprise systems, databases, Internet servers, etc.), thus allowing multiple business functions to be performed through a single integrated view in a browser. The displayed information can be in any format (e.g., texts, figures, graphs, reports, tables, charts, etc.).

SUMMARY

The present application includes systems and techniques relating to rapid loading of multiple frames' content. According to an aspect, a system includes a server to transmit an initial document including frames corresponding to multiple information sources, to retrieve data from the multiple information sources, and to transmit one or more subsequent documents including the data and one or more scripts. The system further includes a browser to receive and display the initial document including the frames without the data, to receive the one or more subsequent documents, and to run the one or more scripts that cause writing of the data, with external scripts inserted, inside the frames. As a result, the data can be displayed in an order of receipt, irrespective of a layout order of the frames.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

As used herein, the term "document" means a set of electronic data, including both electronic data that can be stored in one or more files and electronic data that can be transmitted over a network. A document does not necessarily correspond to a file. A document can be transmitted as a single message or multiple messages over a network. The term "frame" is not limited to HTML frames, and includes any document construct that can be used in a delivered document to orchestrate retrieval and display of content from multiple information sources.

The systems and techniques described here relate to loading of multiple frames' content in a client-server environment. Using the systems and techniques described, the number of connections a client uses to obtain data for multiple frames can be reduced, without limiting the number of information sources providing the content. In addition, the displayed content can be rendered according to the order in which it is received, irrespective of a layout order of the frames. Frames' content can be loaded essentially in parallel, and information sources that are slower to respond with content do not prevent other frames from displaying their content once received. Moreover, because all the content for the frames can be delivered via a common server, various improvements to functionality and performance implemented in that common server can be applied across content categories irrespective of the original information source. Limitations imposed by a client and/or browser (e.g., limits to the total number of full connections allowed at one time) can be overcome using the systems and techniques described. A single request from a client can result in multiple asynchronous requests to additional information sources and content retrieved in parallel. In some implementations, such as in satellite communication, the frames and the retrieved content can be delivered together to the client as one block.

Figure 1:
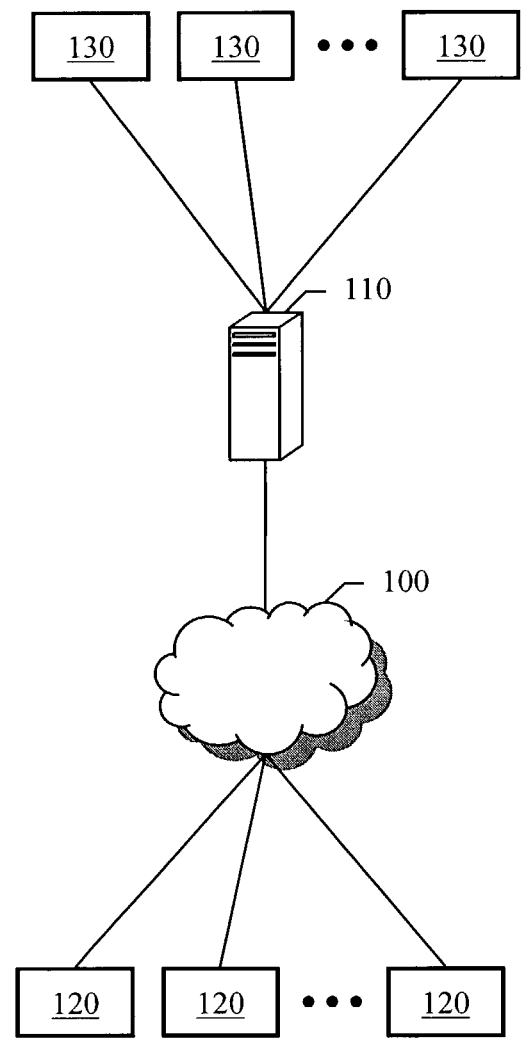
FIG. 1 is a block diagram illustrating an example client-server environment.

FIG. 1 is a block diagram illustrating an example client-server environment. A network 100 provides communication links between a server 110 and one or more clients 120. The network 100 can be any communication network that links machines capable of communicating using one or more networking protocols, including a local area network (LAN), metropolitan area network (MAN), wide area network (WAN), enterprise network, virtual private network (VPN), the Internet, etc. The server 110 can be any machine and/or process, capable of communicating over the network 100. The server 110 has access to resources 130, which can be resources local to the server 110 and/or remote resources available through a network, such as the network 100 or other networks (e.g., an enterprise network). The clients 120 can be any machines or processes capable of communicating over the network 100 with the server 110. For example, the server 110 can be an enterprise portal server providing business functions over the Internet, and the clients 120 can be Web browsers, such as Internet Explorer, provided by Microsoft Corporation of Redmond, Wash. The clients 120 request resources from the server 110, and the server 110 provides requested resources to the clients 120.

Figure 2:
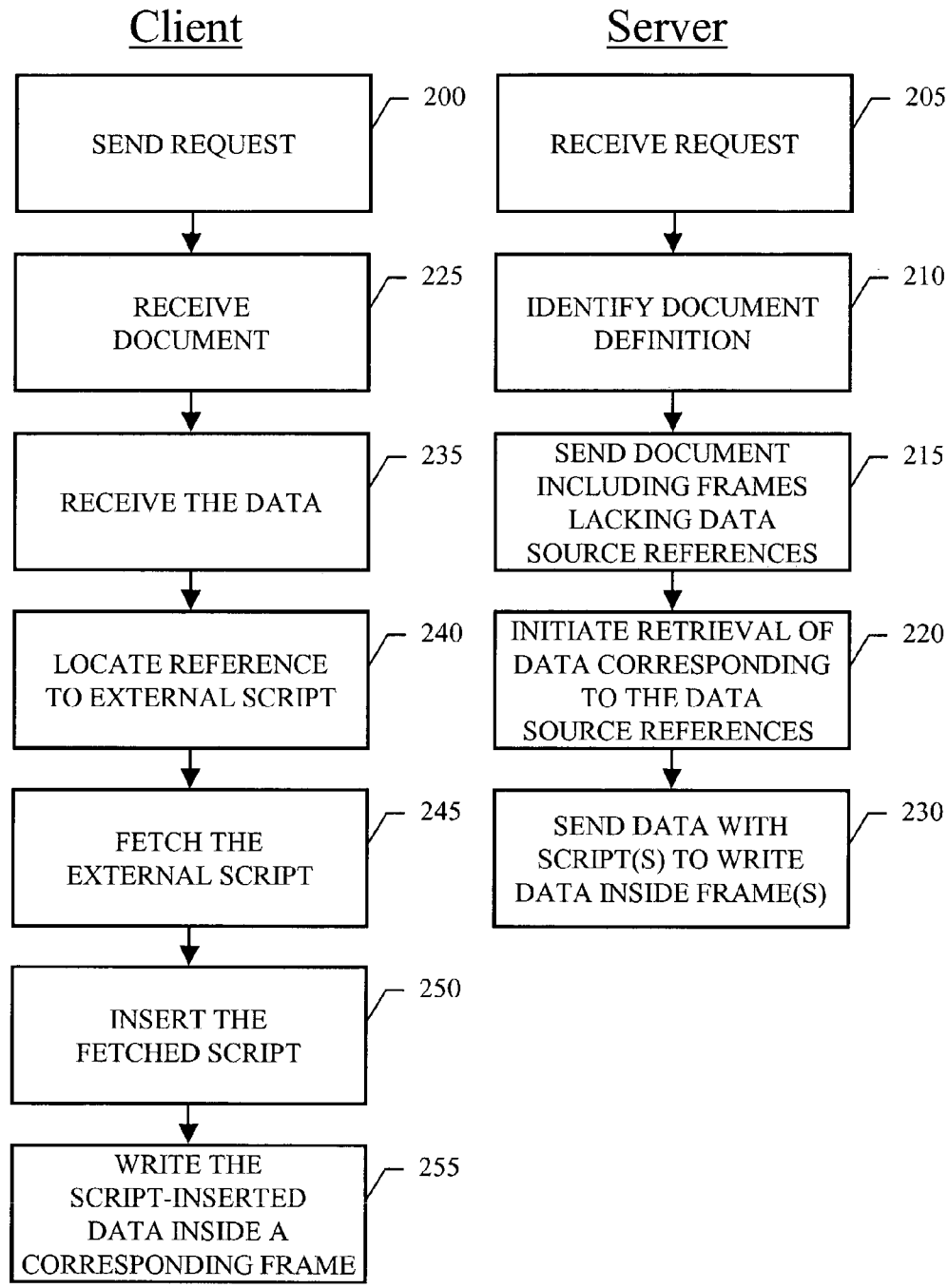
FIG. 2 is a logic flow diagram illustrating an example client process and a corresponding server process loading multiple frames' content.

FIG. 2 is a logic flow diagram illustrating an example client process and a corresponding server process loading multiple frames' content. A client sends a request to a server at 200. The server receives the request at 205. In response to the received request, the server identifies a document definition corresponding to a document at 210. For example, the client request can be for a page in a business management application. The document definition may indicate a document (e.g., an HTML document) to be sent to the requesting client, and also indicate data source references for the document. The document includes multiple frames, and the data source references identify information sources from which data can be obtained to fill those frames. The frames can be inline frames (e.g., iFrames in HTML).

The server sends the document, including the frames, to the client at 215. The frames in the document lack the data source references. The frames may be such that the client does not generate its own requests to fill the frames, such as by the frames having an empty source field. Alternatively, the frames may include data source references back to the server. Substantially simultaneously and asynchronously with sending the document, the server initiates retrieval of data corresponding to the frames and the data source references at 220. The server can send requests to the information sources identified by the data source references in order to obtain the data to populate the frames. These requests can be sent before the document is sent to the client, after the document is sent, or overlapping with the document transmission, and do not require any particular order. In general, the document is sent to the client before all of the data requested from the information sources is received at the server.

The client receives the document including the frames at 225. The document can be rendered on a display at this point; the frames may appear empty in the display until the data used to fill the frames is received. As the data is received at the server, the server sends the retrieved data to client at 230, such that the client populates the appropriate empty frames with the data. The retrieved data can be sent to the client in the order it is received at the server, irrespective of a layout order defined by the frames. The server can send the retrieved data and a script that causes the client to write the retrieved data inside a corresponding frame of the frames, thereby resulting in the retrieved data being rendered inside the corresponding frame at the client and displayed to a user. For example, the server can send a document including the script and the data. The data can be designated with a tag that prevents the client from accessing the data independent from the script (e.g., wrapped with an XMP tag).

Moreover, the server can cache the retrieved data (e.g., Web pages and other files) so that successive requests can be satisfied by the cache rather than by sending a new request to the information source. Information retrieved from the cache is generally retrieved more quickly. Such caching of retrieved data can be performed even when the data is updated frequently at the information source, such as every 2 minutes, because caching can improve system performance in such circumstances. The cache update frequency at the server can be adjusted based on the information source.

Whether caching is used, the nature of the caching, and the cache update frequency, can be parameters subject to user control. Additionally, caching can involve multiple files for each set of retrieved data. Two files can be created for each set of data corresponding to a frame (e.g., an HTML code rendition and a file containing the raw data relating to the frame), and multiple copies of these files can be created for each user in the case of an enterprise portal system, since the content displayed in a frame may vary among users of the enterprise portal. The caching can be on a per-requested-document basis and can provide various levels of data sharing between users. The caching can be done on the raw data before rendering (e.g., XML data) and/or after rendering (e.g., HTML content). Using such caching can minimize the time it takes to connect to the server in the context of using only one connection between the client and the server.

The client receives the data corresponding to the frames and the data source references at 235. The client receives this data without having specifically requested this data from the information sources identified by the data source references. The client locates in the received data, references to any external scripts at 240. An external script is fetched at 245. The fetched script is inserted into the received data at 250. Then the script-inserted received data is written inside a corresponding frame at 255. Thus, the script-inserted received data can be rendered inside the corresponding frame. Rendering of the received data can be in an order of receipt, irrespective of a layout order defined by the frames.

Fetching the external script can involve requesting the external script from the server, which in turn requests the external script from the appropriate information source. For example, in the Internet Explorer (IE) browser, the server can be used as a proxy to obtain external scripts since the browser may prevent fetching of scripts that come from a domain different from that of the original document. The server can send retrieved external scripts to the client and simulate as if the retrieved scripts are coming from the same domain.

Alternatively, the server can perform the fetching of external scripts independently from the client. For example, instead of the client parsing the received data to locate references to external scripts, the server can perform such parsing before sending the retrieved data to the client. Then the fetched external scripts can be inserted into the retrieved data that is sent to the client.

In any case, the script-inserted received data can be rendered inside the corresponding frame at the client. Performing this script insertion causes all scripts referred to and/or included in the retrieved data to be run properly. For example, the IE browser behaves such that when writing the code inside an iFrame, the browser runs the embedded content first and afterwards the external scripts. By parsing the data, fetching external scripts and inserting the external scripts before writing the data inside the frame, scripting problems can be prevented.

The processing of the data received at the client can be performed according to a script sent from the server along with the data. The client receives the data and script, and runs the script to write the data into the appropriate frame. This script can also cause the client to change one or more base tags and add one or more cookies to the client. Thus, the server can forward cookies from a data source thru the page's server to the browser.

Figure 3:
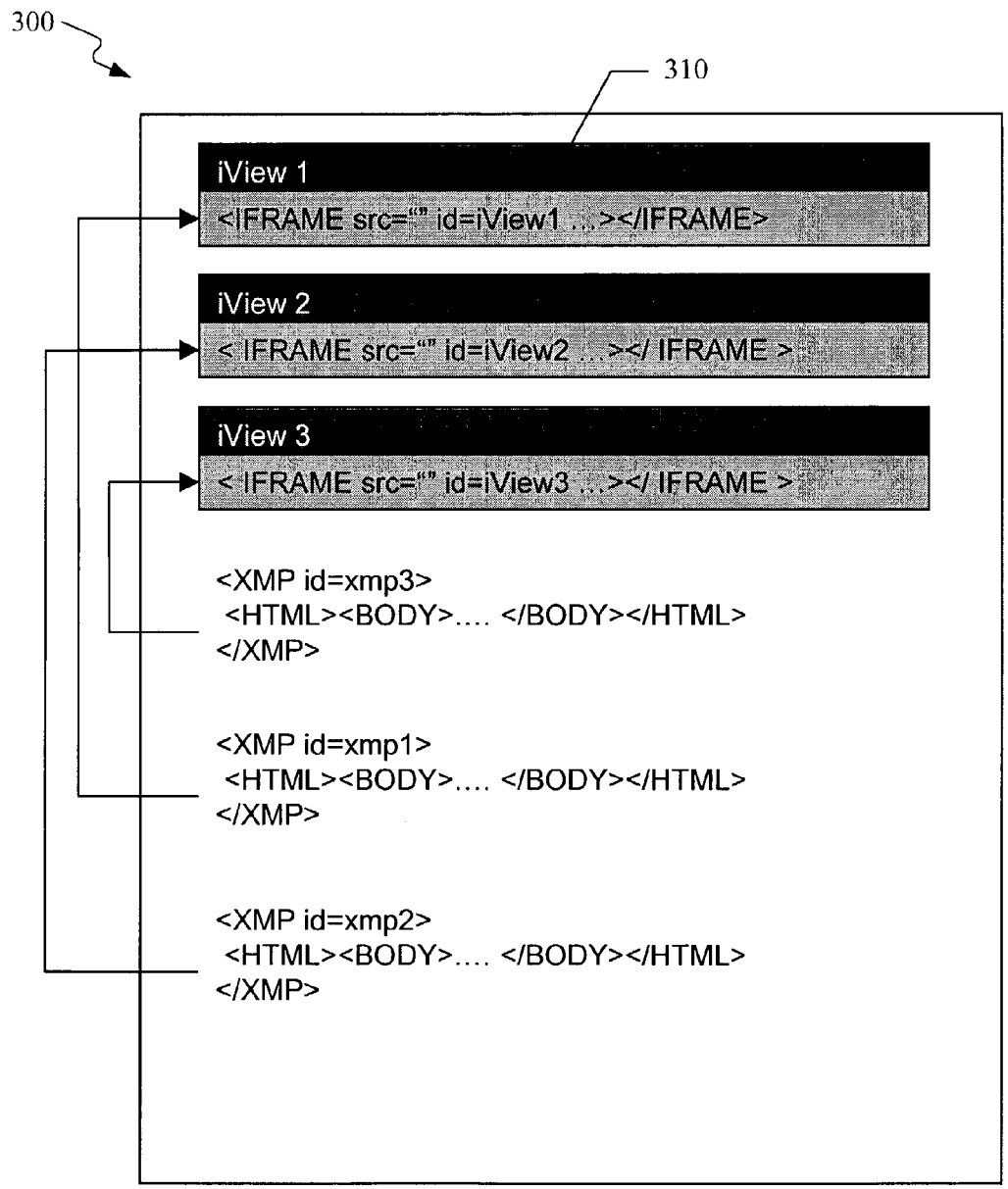
FIG. 3 is a block diagram illustrating example asynchronous data retrieval and writing of retrieved data into corresponding frames.

FIG. 3 is a block diagram illustrating example asynchronous data retrieval and writing of retrieved data into corresponding frames. A browser sends a request to a server for a page. The server may be part of an enterprise portal providing business functions over a network (e.g., an enterprise network, VPN, the Internet) by providing documents, such as coordinated documents 300. The frames may be included in various integrated views (iViews) of business information, such as an iView 310. The iViews can be business reports and/or analysis tools (e.g. applications or links into applications). The iViews can be customizable and can provide links to a wide variety of information sources, both public and private. An iView represents an independent content object and can be implemented using XML (eXtensible Markup Language), HTML and one or more scripts.

The server receives the request from the client for the page and checks in a metadata storage for the definition of the requested page. The definition may contain information regarding all the iViews included in the page. The server sends an asynchronous request to retrieve the content needed to fill the page. Then, the server returns to the browser the iFrames of each of the iViews that are included in the page. The iFrames do not have source and some other parameters for later use (e.g., a parameter which defines whether to use an automatic height feature, which resizes an iFrame to the real size of the content). Thus, empty iFrames can be returned, such as:

<iframe src=" " id="iview123" autoHeight="true" . . . >

Alternatively, iFrames that retrieve the iViews directly from the server can be returned, such as:

<iframe src="http://server/iView/GetiView?iView=123" autoHeight="true" . . . >

Meanwhile, the server asynchronously retrieves the data from the information sources, such as business databases and back-end systems, and Web sites or other HTTP (HyperText Transfer Protocol) servers. The content to be presented at the client using the iFrames is first received at the server, and can thus be cached at the server for use in response to future requests.

An SSL (Secure Socket Layer) implementation can be slightly different. In SSL, the src attribute can be set equal to a dummy page on the server, <iframe src=https://server/iView/Empty.html . . . > instead of using 'about: . . . ' as source:

<iframe src="about:" . . . >.

Whenever the server receives a result for an iView, the server returns the result to the browser wrapped in <XMP> tags and adds a script (e.g., JScript code). When the browser runs the script, the browser copies the content of the iView into the corresponding iFrame, which was sent earlier by the server. This script is responsible for making the iFrame function as though the iFrame received this data directly from the information source. This script can make changes to the <base> tag if necessary, add relevant cookies, load other scripts, etc.

With respect to the cookies, the server receives the cookies, parses them, modifies them, and sends them to the browser in such a way that the browser considers the cookies as having come from the original information source. The server can simulate different information sources by changing parameters of the cookies. For example, the cookie parameters relating to the source of the cookie and the domain to which the cookie should be sent can be changed.

When the browser gets a cookie from a server, the cookie contains the domain name to which the browser should use this cookie. The page's server reads the cookies which come from the data server and adds a Java script which adds these cookies to the document (done on the client side). In addition the server changes the domain of the cookie in why which is called 'relax domain', meaning it truncates the first part of the domain (e.g., server.company.com becomes company.com).

With respect to the <base> tag, because the browser receives the iView from the page's server and not from the original information source, the <base> tag of the HTML document should be changed. This change should take into account the possibility of more than one base tag in the document, and also the fact that some URLs (Universal Resource Locators) end with '/'. Implementing this change is straightforward.

As shown in FIG. 3, the content of the iViews can be written into the corresponding iFrames in an order of receipt, irrespective of a layout order defined by the iFrames. Once content is copied into an iFrame, the browser then treats this iFrame as if it is connected directly to the appropriate information source.

Figure 4:
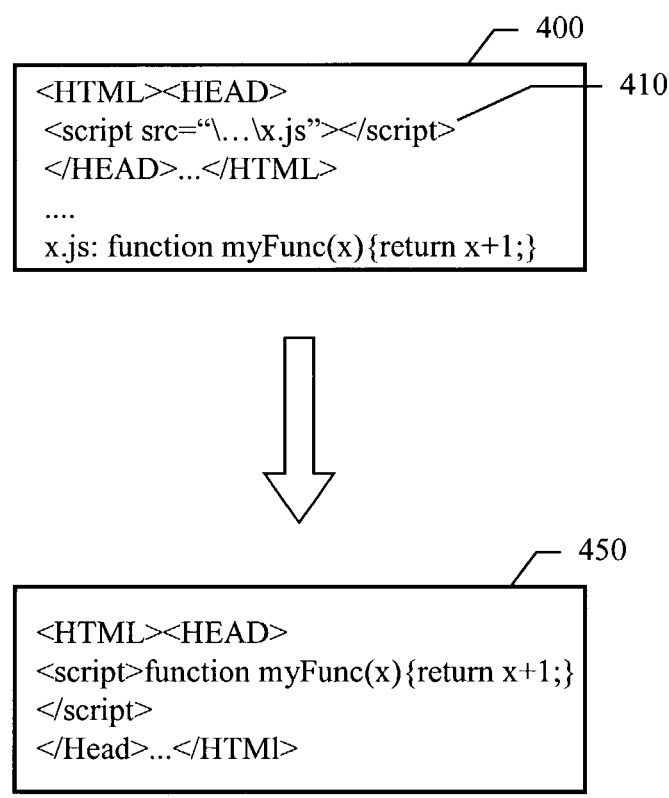
FIG. 4 is a block diagram illustrating example script fetching and insertion.

Moreover, the server can determine if there are external scripts in the iView, and if so, the script sent with the content includes parsing functionality to locate, fetch and insert the external scripts at the client. FIG. 4 is a block diagram illustrating example script fetching and insertion. An HTML document 400 is the original content and includes a reference 410 to an external script. The HTML document 400 is parsed by the browser, the content of the external script is fetched using a client side object (installed with the browser), and the fetched script is written as if it were fetched with the original document.

If the browser prevents the code from fetching scripts that come from a domain different from that of the original document (i.e., the page itself), the code causes the browser to go through the server again like a proxy. The server fetches the external script and returns it to the browser for insertion into the HTML document 400. The server causes the browser to consider the external scripts as if they are coming from the same domain. The browser sends a request to the server with a parameter indicating which script to fetch (e.g., http://server/iview/fetch?scripts=http://server2/script.js). The server gets the parameter and fetches the requested scripts. Then it returns the content of the fetched script as the response. From the browser's point of view, it is as the scripts comes from the page's server.

Once the external script is fetched and inserted, a new HTML document 450 is the content written into the iView.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. As used herein, the term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Although only a few embodiments have been described in detail above, other modifications are possible. For example, performance may be improved by optimizing a multi-threading environment, retrieval of the data, parsing of the content, and caching of the data. The logic flows depicted in FIG. 2 do not require the particular order shown, or sequential order, to achieve desirable results.

Other embodiments may be within the scope of the following claims.

What is claimed is:

1. A method comprising:
receiving, at a client executing on at least one client machine, from a server and in response to a request sent to the server by the client, a document, the document comprising a plurality of frames lacking references to information sources from which data for the plurality of frames are to be retrieved, the references to the information sources being indicated by a document definition identified at the server and associated with the document;
causing, by the client, a display of an initial version of the document, the initial version comprising the plurality of frames without data from the sources of data and without the references to the information sources, the plurality of the frames comprising inline frames;
receiving, at the client from the server, one or more subsequent documents comprising one or more scripts and the data for the plurality of frames, the data having been retrieved from the information sources by the server using the references indicated by the document definitions, the receiving of the data occurring in an order associated with retrieval of the data for other frames of the plurality of frames; and
running, at the client, the one or more scripts included in the one or more subsequent documents to cause the data, with one or more external scripts included, to be written inside the frames, the running of the scripts further causing a change of one or more base tags and addition of one or more cookies.

2. A method as in claim 1, further comprising:
parsing, by the client, the one or more subsequent documents to locate a script reference to the external script;
fetching the external script according to the located script reference, the fetching comprising requesting the external script for fetching of the external script by the server;
inserting the external script in the received data, and
writing, using the inserted external script and inside a corresponding frame of the plurality of frames, the received data to load the corresponding frame in an order in which the server receives the data for each frame of the plurality of frames from the information sources irrespective of a layout order defined by the plurality of frames.

3. The method of claim 2, wherein:
all communications used to fill the plurality of frames with data from the sources of data are performed in stages using a single connection, the sources of data being external to the server;
the plurality of frames exist in parallel; and
each frame of the plurality of frames receives data from the server that further receives data for each frame from some of the sources of data.

4. The method of claim 2, wherein processing the received data comprises rendering the received data according to the order of the loading and irrespective of a layout order defined by the plurality of frames.

5. The method of claim 2, wherein:
the fetching of the external script comprises requesting the external script from the server; and
the receiving of the corresponding data for each frame occurs after the receipt of the document that includes the plurality of frames.

6. A method comprising:
receiving, at a server executing on at least one server machine, a request from a client;
identifying a document definition in response to the request, the document definition associated with a document, the document comprising a plurality of frames lacking references to information sources from which data for the plurality of frames are to be retrieved, the document definition comprising references to the information sources, the plurality of the frames comprising inline frames;
sending the document to the client for display by the client in a browser of an initial version of the document, the initial version comprising the plurality of frames without the data from the information sources and without the references to the information sources;
initiating, after sending the document, asynchronous retrieval of data corresponding to the plurality of frames and the data source references, the asynchronous retrieval being by the server and from the information sources;
fetching an external script, referred to in the retrieved data, for insertion in the retrieved data; and
sending one or more subsequent documents from the server to the client, the one or more subsequent documents comprising the retrieved data and the fetched external script that causes the client to perform operations comprising writing the retrieved data inside a corresponding frame of the plurality of frames with the external script included, changing one or more base tags, and adding one or more cookies, the retrieved data being sent to the client in an order associated with the asynchronous retrieval.

7. The method of claim 6, wherein the external script causes the client to perform operations further comprising locating in the retrieved data a reference to the external script, requesting the external script, and inserting the external script in the retrieved data, and wherein fetching the external script comprises fetching the external script in response to the client requesting the external script.

8. The method of claim 6, further comprising caching the retrieved data.

9. The method of claim 6, wherein:
the sending of the retrieved data to the client comprises sending the retrieved data in an order of receipt and irrespective of a layout order defined by the plurality of frames; and
the information sources are websites containing the data.

10. The method of claim 6, wherein sending the retrieved data to the client comprises sending the retrieved data along with the external script.

11. A system comprising:
at least one processor; and
at least one memory, the at least one processor and the at least one memory configured to provide:
a server to transmit a document including frames corresponding to multiple information sources, to retrieve data from the multiple information sources, and to transmit one or more subsequent documents including the data and one or more scripts; and a browser to receive and display the initial document including the frames without the data and without references to the information sources for the frames, to receive the one or more subsequent documents, and to run the one or more scripts causing writing of the data, with external scripts inserted, inside the frames, the running of the scripts further causing a change of one or more base tags and an addition of one or more cookies, the frames comprising inline frames, wherein the references are indicated by a document definition and identified at the server, the references being used by the server to retrieve the corresponding data from the sources, the receipt of the data occurring in an order associated with retrieval of the data for other frames of the frames.

12. The system of claim 11, wherein the browser runs the one or more scripts as received to display the data in an order of receipt, irrespective of a layout order defined by the frames.

13. The system of claim 12, wherein the browser parses the one or more subsequent documents to locate references to the external scripts referenced in the data and requests one or more of the external scripts from the server, and wherein the server fetches the one or more of the external scripts for the browser.

14. A computer program product comprising a non-transitory machine-readable medium storing instructions that, when executed by a machine comprising a processor cause the machine to perform operations comprising:

receiving, at a client executing on at least one client machine, from a server and in response to a request sent to the server by the client, a document, the document comprising a plurality of frames lacking references to information sources from which data for the plurality of frames are to be retrieved, the references to the information sources being indicated by a document definition identified at the server and associated with the document;

causing, by the client, a display of an initial version of the document, the initial version comprising the plurality of frames without data from the information sources and without the references to the information sources, the plurality of the frames comprising inline frames;

receiving, at the client from the server, one or more subsequent documents comprising one or more scripts and the data for the plurality of frames, the data having been retrieved from the information sources by the server using the references indicated by the document definitions, the receiving of the data occurring in an order associated with retrieval of the data for other frames of the plurality of frames; and running, at the client, the one or more scripts included in the one or more subsequent documents to cause the data, with one or more external scripts included, to be written inside the frames, the running of the scripts further causing a change of one or more base tags and addition of one or more cookies.

15. A computer program product as in claim 14, wherein the operations further comprise:

parsing, by the client, the one or more subsequent documents to locate a script reference to the external script;

fetching the external script according to the located script reference, the fetching comprising requesting the external script for fetching of the external script by the server;

inserting the external script in the received data, and writing, using the inserted external script and inside a corresponding frame of the plurality of frames, the received data to load the corresponding frame in an order in which the server receives the data for each frame of the plurality of frames from the information sources irrespective of a layout order defined by the plurality of frames.

* * * * *